US009449027B2

(12) United States Patent
Lehtiniemi et al.

(10) Patent No.: US 9,449,027 B2
(45) Date of Patent: Sep. 20, 2016

(54) APPARATUS AND METHOD FOR REPRESENTING AND MANIPULATING METADATA

(71) Applicant: Nokia Technologies Oy, Espoo (FI)

(72) Inventors: Arto Juhani Lehtiniemi, Lempäälä (FI); Antti Johannes Eronen, Tampere (FI); Juha Henrik Arrasvuori, Tampere (FI); Jukka Antero Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 196 days.

(21) Appl. No.: 13/909,833

(22) Filed: Jun. 4, 2013

(65) Prior Publication Data

US 2014/0359441 A1 Dec. 4, 2014

(51) Int. Cl.
*G06F 3/0481* (2013.01)
*G06F 17/30* (2006.01)

(52) U.S. Cl.
CPC ... *G06F 17/30265* (2013.01); *G06F 17/30038* (2013.01)

(58) Field of Classification Search
CPC .................................................... G06F 3/0481
See application file for complete search history.

(56) References Cited

U.S. PATENT DOCUMENTS 8,260,266 B1 * 9/2012 Amidon ............ H04M 3/42348 455/414.1
2006/0041591 A1 * 2/2006 Rhoads ...................... 707/104.1
2010/0031170 A1 * 2/2010 Carullo et al. ................ 715/762
2012/0300972 A1 11/2012 Rodriguez
2012/0300974 A1 11/2012 Rodriguez

FOREIGN PATENT DOCUMENTS

EP 1 150 215 A2 10/2001
WO WO 01/61508 A1 8/2001
WO WO 2006/106173 A1 10/2006

OTHER PUBLICATIONS

"*Adobe Photoshop Lightroom*;" retrieved on Aug. 13, 2013 from <http://en.wikipedia.org/wiki/Adobe_Photoshop_Lightroom>.
"*Google Goggles*;" Wikipedia; retrieved on Aug. 13, 2013 from <http://en.wikipedia.org/wiki/Google Goggles>.
"*QR code*;" Wikipedia; retrieved on Aug. 13, 2013 from <http://en.wikipedia.org/wiki/QR_code>.

(Continued)

*Primary Examiner* — Peiyong Weng
(74) *Attorney, Agent, or Firm* — Alston & Bird LLP

(57) ABSTRACT

Mechanisms are described for providing visual representations of metadata so as to allow for an easier, more intuitive, and more entertaining way for a user to manage metadata by allowing a user to execute operations relating to the metadata through interactions with the visual representations of that metadata. A user can further define visual objects and use such objects for searching media content items, such as by using a visual representation of metadata as a filter and displaying graphical depictions of associations between the visual representations of metadata and the associated media content item. Moreover, operations executed on the visual representations, such as copying, pasting, and modifying the visual representations, are translated to actions on the metadata itself and can be applied across different devices, as well as different media content items and groups of media content items.

16 Claims, 8 Drawing Sheets

12
10
TRANSMITTER
32
CAMERA
14
20
16
28
DISPLAY
RECEIVER
PROCESSOR
30
KEYPAD
RINGER
22
SPEAKER
34
24
40
42
NON-VOLATILE MEMORY
VOLATILE MEMORY
MICROPHONE
26
38
UIM

(56) References Cited

OTHER PUBLICATIONS

International Search Report and Written Opinion from International Application No. PCT/IB2014/061894 dated Oct. 8, 2014.

Vidya Setlur, Conrad Albrecht-Buehler, Amy A. Gooch, Sam Rossoff, Bruce Gooch; "Semanticons: Visual Metaphors as File Icons"; Computer Graphics Forum; vol. 24, Issue 3; Sep. 2005; pp. 647-656.

* cited by examiner

APPARATUS AND METHOD FOR REPRESENTING AND MANIPULATING METADATA

TECHNOLOGICAL FIELD

Example embodiments of the present invention relate generally to visually representing metadata and providing for the execution of operations using such visual representations.

BACKGROUND

Different types of content items often have associated metadata. The metadata may, for example, provide a description of the content item. Metadata associated with a media content item, such as a song file, for example, may provide information regarding the artist, genre of music, date of recording, and critic or fan reviews.

A consumer of content items, such as media content items, may find it necessary or desirable to view metadata content and execute operations with respect to the metadata, such as to transfer metadata, copy metadata, delete metadata, and so on.

BRIEF SUMMARY OF EXAMPLE EMBODIMENTS

Accordingly, embodiments of an apparatus, method, and computer program product are described that can provide a visual representation of metadata associated with a content item that a user may then interact with to execute certain metadata-related operations using a mobile device. In particular, embodiments of an apparatus for providing visual representations of metadata may include at least one processor and at least one memory including computer program code. The at least one memory and the computer program code may be configured to, with the processor, cause the apparatus to at least read metadata associated with a media content item presented on a target device, identify a visual representation corresponding to the metadata, cause the visual representation to be presented on a display, and receive user input via user interaction with the visual representation presented, wherein the user input results in execution of an operation with respect to the corresponding metadata.

In some cases, the at least one memory and the computer program code may be configured to, with the processor, cause the apparatus to read the metadata using a user device that is different from the target device, and the display may be a display of the user device. The at least one memory and the computer program code may be configured to, with the processor, cause the apparatus to identify the visual representation by accessing a third party server.

In some embodiments, the user input may comprise copying the visual representation and applying the copied visual representation to a different media content item. The resulting operation that is executed may associate the metadata corresponding to the copied visual representation with the different media content item. The media content item may be presented on a first target device and the different media content item may be presented on a second target device.

The at least one memory and the computer program code may be further configured to, with the processor, cause the apparatus to receive user input via a selected visual representation that results in execution of a filtering operation in which additional media content items associated with metadata that corresponds to the selected visual representation are identified. In still other cases, the at least one memory and the computer program code may be further configured to, with the processor, cause the apparatus to read metadata associated with a plurality of media content items that are displayed substantially simultaneously; to identify visual representations of the metadata associated with the plurality of media content items displayed; to cause the visual representations to be presented on the display; and to receive user input via interaction with at least one of the visual representations.

In other embodiments, a method and a computer program product are described for providing visual representations of metadata by reading metadata associated with a media content item presented on a target device; identifying a visual representation corresponding to the metadata; causing the visual representation to be presented on a display; and receiving user input via user interaction with the visual representation presented, wherein the user input results in execution of an operation with respect to the corresponding metadata.

In some cases, reading the metadata may comprise using a user device that is different from the target device, and the display may be a display of the user device. The visual representation may be accessed from a third party server.

In some embodiments, the user input may comprise copying the visual representation and applying the copied visual representation to a different media content item. The resulting operation that is executed may associate the metadata corresponding to the copied visual representation with the different media content item. The media content item may be presented on a first target device and the different media content item may be presented on a second target device.

In some embodiments, user input may be received via a selected visual representation that results in execution of a filtering operation in which additional media content items associated with metadata that corresponds to the selected visual representation are identified. In still other cases, metadata may be read that is associated with a plurality of media content items that are displayed substantially simultaneously. Visual representations of the metadata associated with the plurality of media content items displayed may be identified; the visual representations may be caused to be presented on the display; and user input may be received via interaction with at least one of the visual representations.

In still other embodiments, an apparatus is described for providing visual representations of metadata. The apparatus includes means for reading metadata associated with a media content item presented on a target device; means for identifying a visual representation corresponding to the metadata; means for causing the visual representation to be presented on a display; and means for receiving user input via user interaction with the visual representation presented, wherein the user input results in execution of an operation with respect to the corresponding metadata.

BRIEF DESCRIPTION OF THE SEVERAL VIEWS OF THE DRAWING(S)

Having thus described certain example embodiments of the invention in general terms, reference will now be made to the accompanying drawings, which are not necessarily drawn to scale, and wherein:

DETAILED DESCRIPTION

Figure 1:
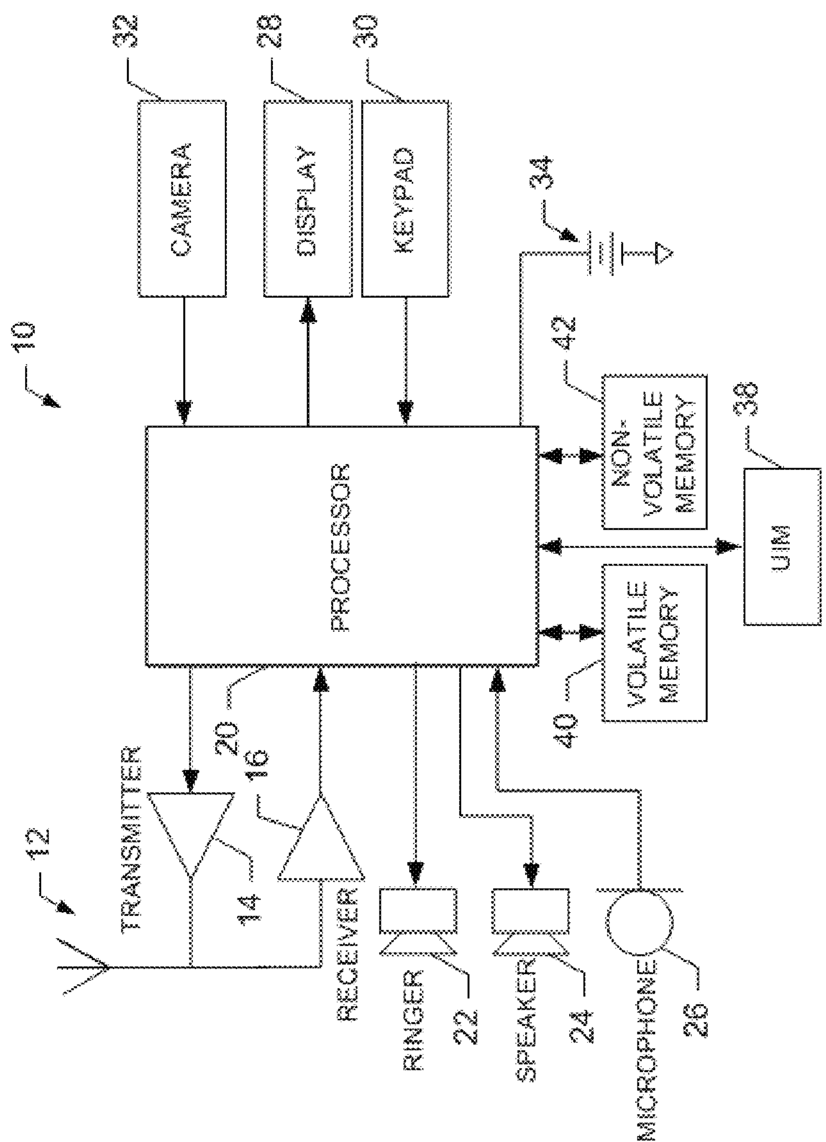
FIG. 1 illustrates one example of a communication system according to an example embodiment of the present invention.

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, metadata may be associated with various types of content items to provide a user with information regarding the content item. A media content item, such as a music file, a video file, a picture file, etc., may have associated metadata (e.g., metadata tags) that describes various aspects of the particular file. Taking a picture file as an example, the picture file may have metadata associated with it that provides information regarding the photographer (who took the picture), when the picture was taken, the people in the picture, the location where the picture was taken, copyright information, the title of the picture, and so on.

A consumer of the content item may not only want to read the metadata associated with a particular content item of interest, but may also want to manipulate the metadata. For example, a user may want to add metadata to a content item, remove metadata, copy metadata, and alter metadata. A user may also want to transfer metadata between files and/or between different devices, which can be a difficult task.

Accordingly, example embodiments of the present invention provide mechanisms for reading metadata associated with different content items (such as media content items) using a mobile device that is configured to identify and present visual representations of metadata associated with displayed media content items. The visual representations of the metadata may, for example be provided on a display of the user's mobile device, and the user may be able to interact with the visual representations so as to manage the corresponding metadata in a way that is easy, visual, and intuitive.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as personal digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments. In some embodiments, for example, fixed (non-mobile) devices that may benefit from the embodiments described herein may include household appliances, such as refrigerators incorporating a touch screen and configured for WiFi connectivity.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. In some embodiments, for example, the media capturing element 32 may be associated with a viewfinder of the mobile terminal 10, where the viewfinder may be used by a user of the mobile terminal 10 to view a scene to be captured by the media capturing element 32. As described in greater detail below, according to some embodiments, the scene may be a media content item that is presented on a display of a target device (e.g., another mobile terminal). Metadata associated with the media content item presented on the target device may be read by the mobile terminal (e.g., the user device) when the media content item is viewed through the viewfinder, such as when the user device is placed on top of the target device presenting the media content item. The mobile terminal 10 (or even some other fixed terminal) may also practice example embodiments in connection with images or video content (among other types of content) that are produced or generated elsewhere, but are available for consumption at the mobile terminal 10 (or fixed terminal). Thus, in some embodiments, the target device (described in greater detail below) and/or the user device may be embodied by the same or different mobile terminals 10.

An example embodiment of the invention will now be described with reference to FIG. 2, which depicts certain elements of an apparatus 50 for providing visual representations of metadata associated with displayed media content items. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, a mobile computing device, or other user terminal. Moreover, in some cases, part or all of the apparatus 50 may be on a fixed device such as a server or other service platform and the content may be presented (e.g., via a server/client relationship) on a remote device such as a user terminal (e.g., the mobile terminal 10) based on processing that occurs at the fixed device.

Figure 2:
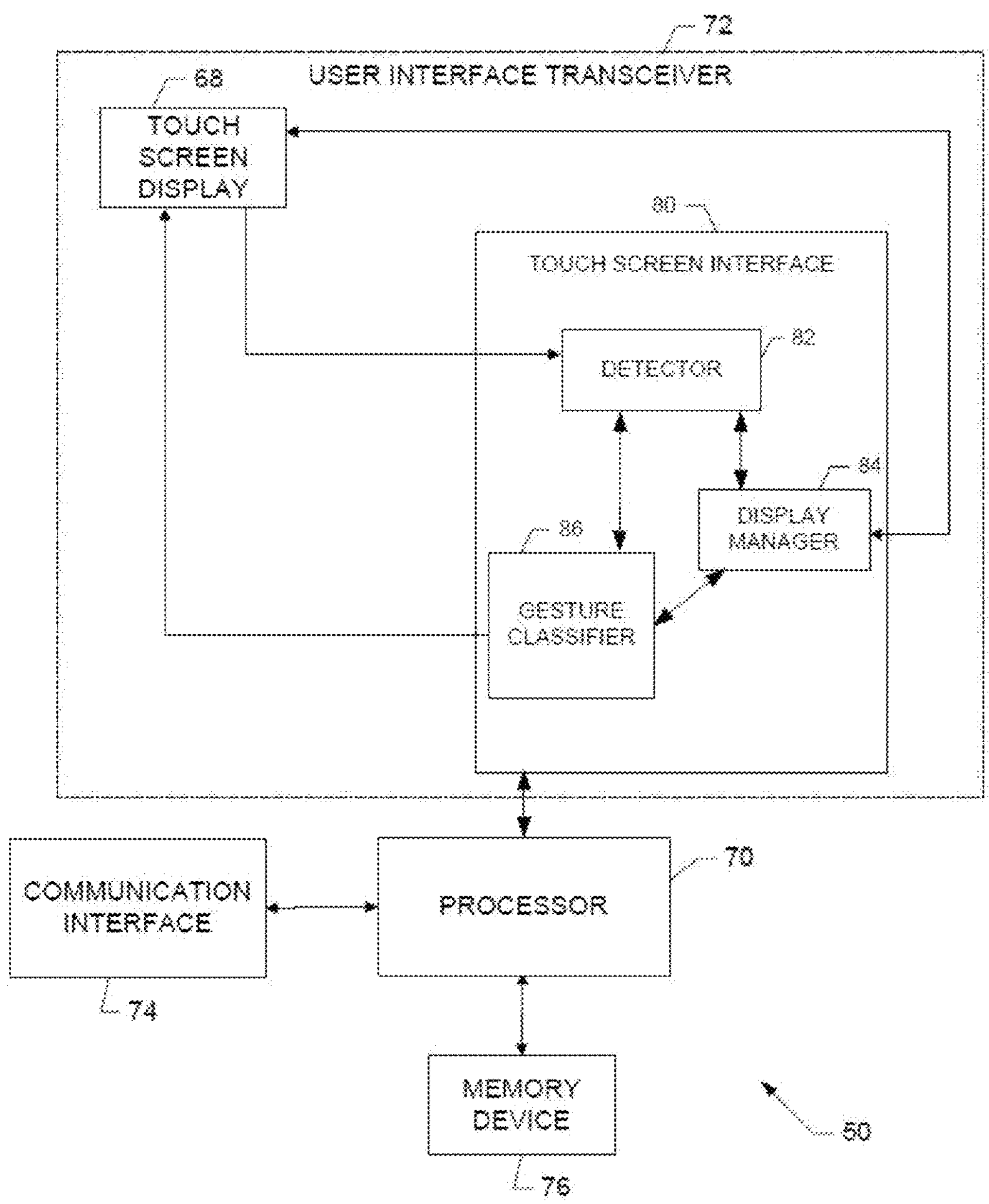
FIG. 2 illustrates a schematic block diagram of an apparatus for providing a visual representation of metadata according to an example embodiment of the present invention.

It should also be noted that while FIG. 2 illustrates one example of a configuration of an apparatus for providing visual representations of metadata associated with displayed media content items, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing visual representations of metadata may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations. In some cases, the input may be in the form of a hovering event, where the input is detected due to proximity of the user's finger or other object to the touch screen display 68 without requiring actual contact with the display.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an example embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

Figure 3:
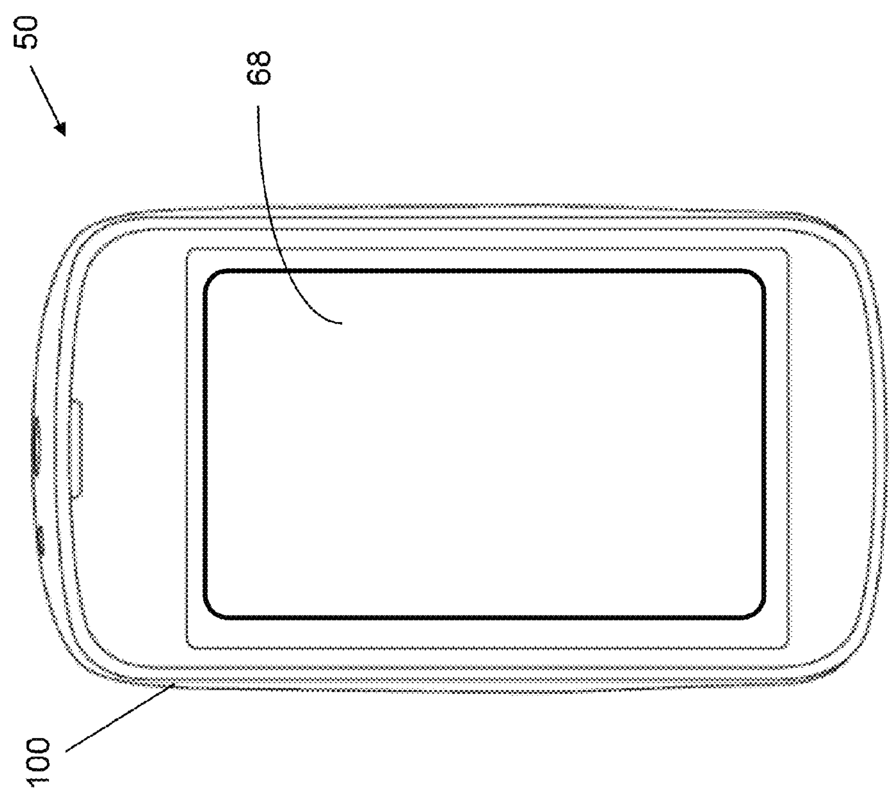
FIG. 3 illustrates a user device embodying an apparatus according to an example embodiment of the present invention.

Turning now to FIG. 3, in general, an apparatus 50 is provided, such as an apparatus embodied by the mobile terminal 10 of FIG. 1 (e.g., a cellular telephone) that has or is otherwise associated with a display, such as a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to read metadata associated with a media content item presented on a target device, identify a visual representation corresponding to the metadata, cause the visual representation to be presented on a display 68, and receive user input via user interaction with the visual representation presented, wherein the user input results in execution of an operation with respect to the corresponding metadata.

Figure 4A:
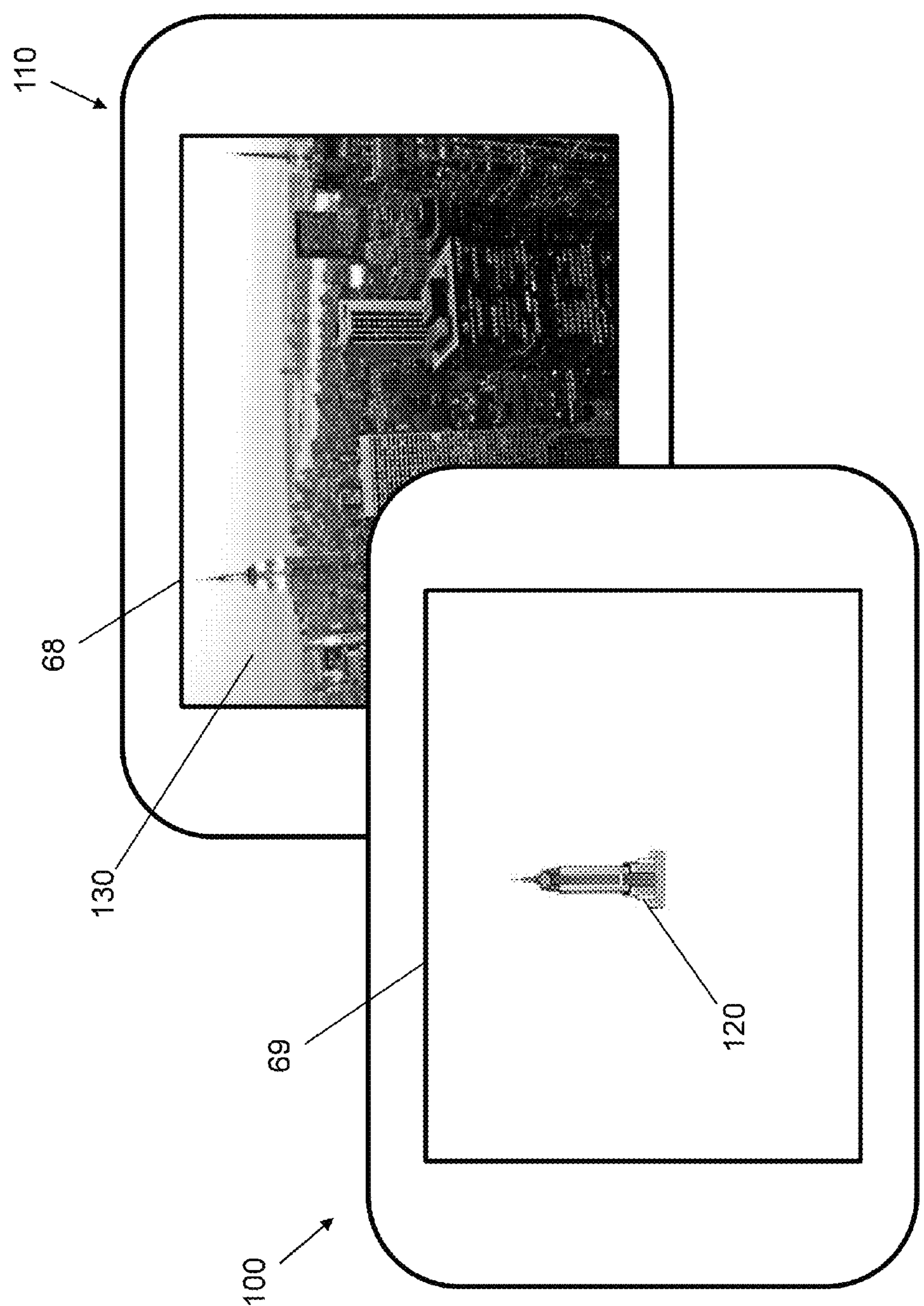
FIG. 4A illustrates a user device configured to read metadata associated with media content items presented on a target device display according to an example embodiment of the present invention.

In some embodiments, the apparatus 50 may be embodied by a user device 100 (e.g., a cellular telephone of the user), and the media content item may be presented on a target device 110 that is different from the user device, as depicted in FIG. 4A. Thus, the at least one memory and the computer program code may be configured to, with the processor, cause the apparatus to read the metadata using a user device 100 that is different from the target device 110. In such embodiments, the display 69 upon which the visual representation 120 may be presented may be a display of the user device 100, whereas the media content item 130 may be presented on a different display 68 of the target device 110.

Figure 4B:
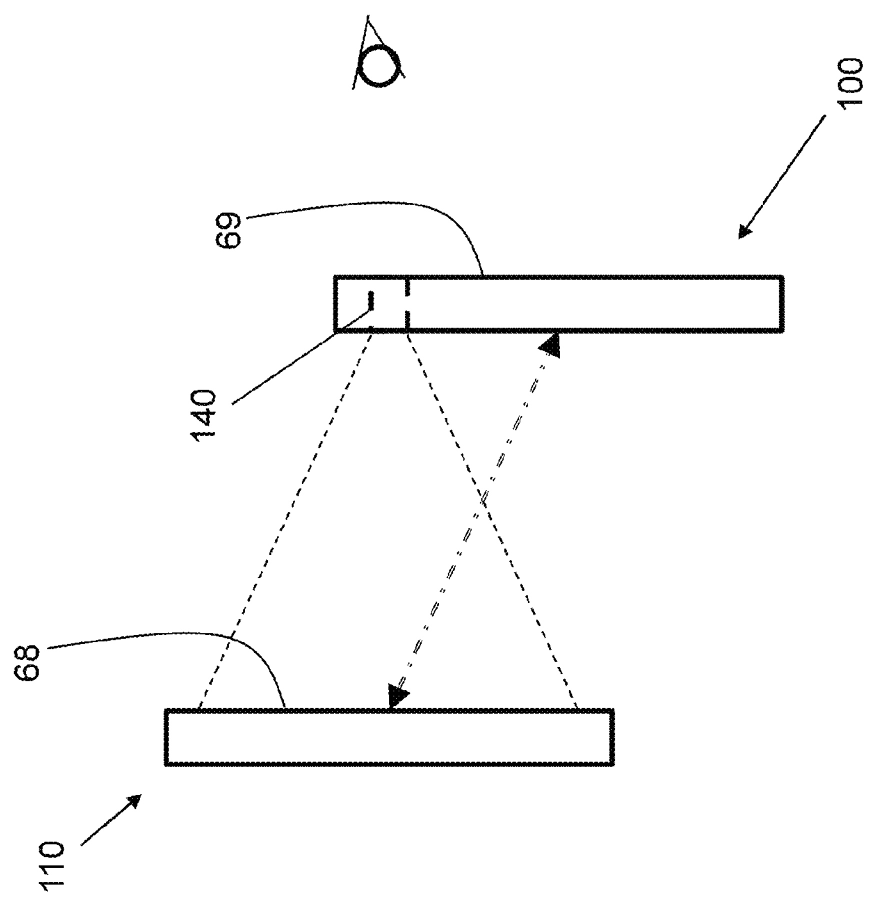
FIG. 4B illustrates a side view of the user device and target device of FIG. 4A.

With reference to FIGS. 4A and 4B, a user of a user device 100 embodying the apparatus 50 of FIG. 2 may, for example, "scan" or "x-ray" a media content item 130 (shown in FIG. 4A) that is displayed on a target device 110 to read metadata associated with the media content item. This may be done by placing the user device 100 on top of the target device 110 or aligning the user device with the target device in such a way that the media content item 130 is visible to the user through a viewfinder 140 of the user device 100, as shown in FIG. 4B.

In the depicted embodiment of FIG. 4A, for example, the media content item 130 is a picture of New York City. The metadata associated with the media content item 130 may include one or more pieces of information regarding the content, such as names of people in the picture, the location (e.g., New York, N.Y.), recognizable objects (e.g., the Empire State Building), comments or captions (e.g., "A bird's-eye view of the Big Apple"), a rating (e.g., how viewers rate the picture as compared to other pictures of New York City), and/or a time, date, or year associated with the picture, among other information. The metadata may be stored in the same file as the media content, such as, for example, in Exchangeable Image File (EXIF) format metadata for images or ID3 metadata for Moving Picture Experts Group (MPEG)-2 Audio Layer III (MP3) audio files. Additionally or alternatively, the metadata may be stored elsewhere, such as in a separate metadata database residing on the target device 110 or in an external server, which may be accessible by the target device or the user device 100 to obtain the associated metadata.

In the embodiment described above and depicted in FIGS. 4A and 4B, the alignment or proximity of the user device 100 with the target device 110 may trigger or enable a connection between the two devices that allows a communication exchange to occur between the devices. In some embodiments, for example, the connection may be implemented using near field communication (NFC). As a result of the connection (depicted in FIG. 4B using a dashed-line arrow), the devices 100, 110 may exchange data, including the metadata associated with the particular media content item and/or the visual representations corresponding to the metadata.

For example, the target device 110 presenting the media content item on its display 68 may, in some cases, also display a graphical indicator of the metadata, such as a barcode or watermark, which may or may not be visible to the user viewing the media content item. The user device 100 may be brought into proximity with and/or aligned with the target device 110 (e.g., as shown in FIGS. 4A and 4B), with the viewfinder 140 and any associated applications of the user device 100 enabled. By analyzing the viewfinder feed, the user device 100 may recognize the graphical indicator (e.g., the barcode) presented on the display 68 of the target device 110 and may send a request (e.g., via NFC) to the target device 110 for metadata associated with the graphical indicator. The target device 110 may, in response, return the metadata and visual representations 120 corresponding to the metadata to the user device 100.

In some embodiments, the at least one memory and the computer program code may be configured to, with the processor, cause the apparatus to identify the visual representation by accessing a third party server or device. For example, the target device 110 may, in some cases, provide links to a third party server, device, or other source from which the metadata and visual representations 120 may be accessed (e.g., downloaded). The user device 100 may thus receive (from the target device 110 or the third party source) the metadata and corresponding visual representations 120 and may present them on the display 68 for the user's consumption.

As noted above, the visual representations 120 may, in some cases, be stored on the target device 110, and there may be a particular visual representation that corresponds with certain metadata types and values. For example, a particular icon may represent different musical genres (e.g., for media content items that are music files), such as rock and pop. Alternatively or additionally, visual representations of metadata values may be searched and accessed from external services, such as by performing keyword searches in catalogs of visual content (e.g., content including images or graphical icons).

According to some embodiments, once a visual representation corresponding to the metadata is identified and presented on the display for the user, the user may be able to interact with the visual representation and thereby provide user input that results in execution of an operation with respect to the corresponding metadata. Said differently, the user may be able to perform certain actions (e.g., manage the metadata) using the visual representations of the metadata. Various different operations may be executed with respect to the metadata using the corresponding visual representations.

In some embodiments, the user input may comprise copying the visual representation and applying the copied visual representation to a different media content item. In this case, the resulting operation that is executed may associate the metadata corresponding to the copied visual representation with the different media content item. For example, turning again to FIG. 4A, metadata associated with the depicted media content item 130 (the picture of New York City) may correspond to a visual representation 120 that is an icon of the Empire State Building. By "scanning" the picture displayed on the target device 110 using the user device 100, the user device may receive the icon 120 and be able to display the icon to the user. The user may then be able to copy the visual representation 120 (e.g., the icon shown) and may paste it to one or more media items using the same "scanning" interaction depicted between the user device 100 and the target device 110. For example, the user can hold the visual representation 120 and select a "copy" option, following which the user may "scan" another media content item on the same target device 110 or another device or may scan another set of media items and, in so doing, may select a "paste" option with respect to the copied visual representation 120. Thus, in some embodiments, the media content item may be presented on a first target device and the different media content item may be presented on a second target device. The copying and pasting of the visual representation 120 may, thus, serve to visually assign the corresponding metadata to the other media content item or items.

Figure 5:
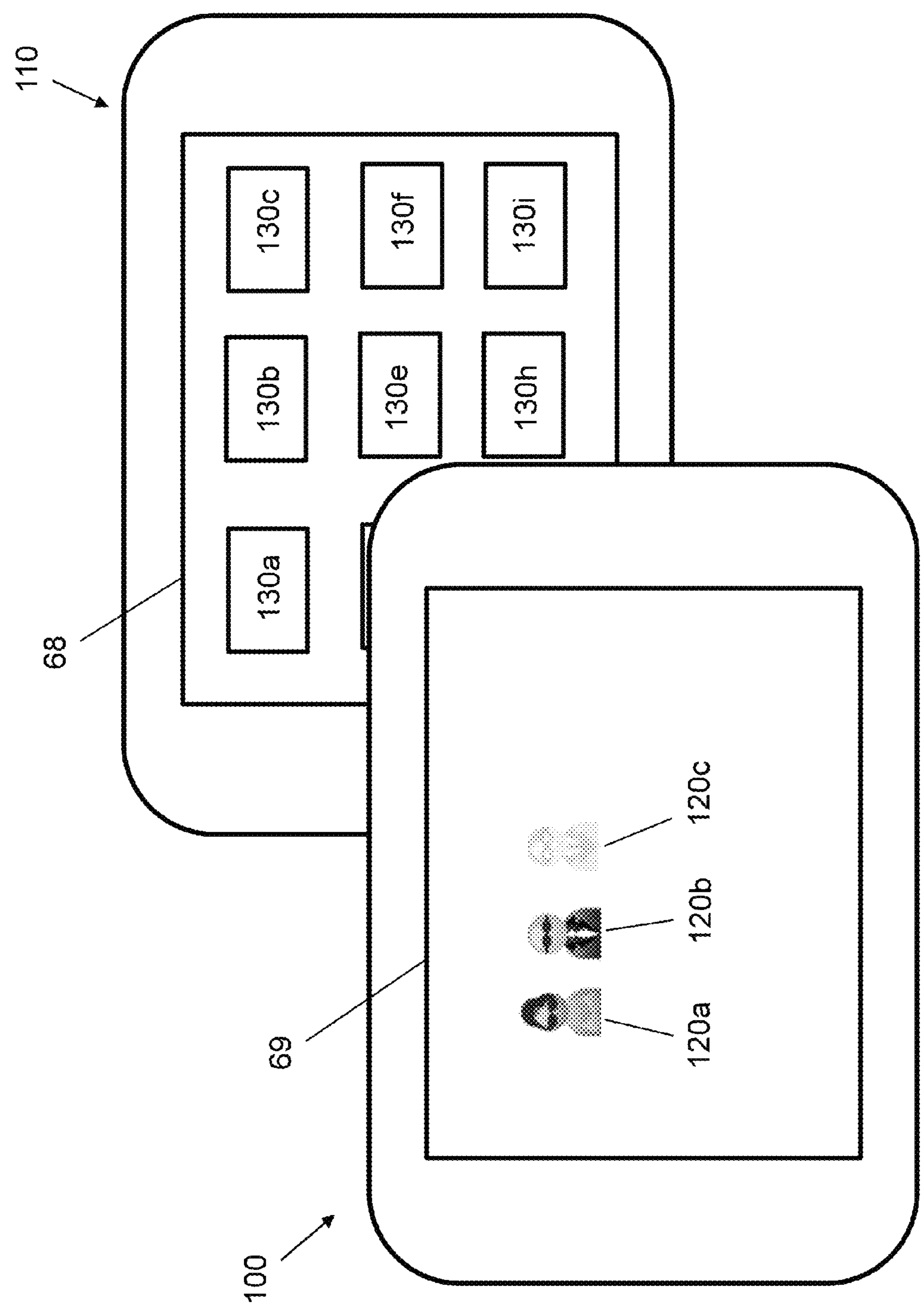
FIG. 5 illustrates a user device and a target device according to an example embodiment of the present invention, where the target device is presenting multiple media content items.

In still other embodiments, multiple media content items may be "scanned," and the visual representations corresponding to the metadata associated with the various media content items may be displayed. Thus, the at least one memory and the computer program code may be further configured to, with the processor, cause the apparatus to read metadata associated with a plurality of media content items 130 that are displayed substantially simultaneously, such as by being displayed within a relatively small period of time (e.g., within 1 second) of one another; to identify visual representations 120 of the metadata associated with the plurality of media content items displayed; to cause the visual representations to be presented on the display 69; and to receive user input via interaction with at least one of the visual representations. This scenario is depicted in FIG. 5.

For example, selected visual representations may be selected and applied to all of the media content items displayed to the user. In FIG. 5, for example, three people (identified via three visual representations 120*a*, 120*b*, 120*c*) may be identified based on the collective metadata of all of the pictures (130*a*-130*i*) displayed on the target device 110; however, only two of those people (120*a*, 120*b*) may be associated with each of the pictures (e.g., as present in the picture, as the photographer, etc.). This may be visually depicted by "greying out" the visual representation 120*c* corresponding to the person who is associated with some, but not all, of the pictures.

The user may be able to select or deselect certain visual representations 120 that the user wishes to apply to selected content items 130. For example, selecting the visual representation 120*c* corresponding to the person who is not associated with each of the pictures (e.g., the greyed-out visual representation) and applying the visual representation to the media content items would write that person into the metadata for all of the content items 130. Alternatively, the user may be able to select only a subset of the media content items 130 on the target device 110 by interacting with the display 68 of the target device (which may, e.g., be a touch screen display as noted above), such that the metadata update would only apply to those selected media content items. Thus, for example, highlighting certain media content items (e.g., items 130*b*, 130*f*, 130*h*) using the display 68 of the target device 110 and then "scanning" those images (e.g., using the user device 100) would apply the metadata update only to the selected subset of media content items.

Similarly, metadata can be added to or removed from media content items 130 based on the user's interactions with the visual representations. For example, a visual representation 120 may be de-selected (e.g., via a user input by touching the object, which may result in the de-selected visual representation being "greyed-out"), and such a de-selection may be applied to one or more media content items as described above to remove the metadata corresponding to the visual representation from the associated media content item. Moreover, new metadata may be associated with existing media content items by applying corresponding visual representations to those items. Visual representations may be found, for example, in a user's gallery or obtained through a service. For example, a service may be associated with the scanning application that may display a set of visual representations that is favored or commonly used by various users. The service may collect such representations and their corresponding metadata values from a population of users of the scanning application.

Other operations that may be executed using embodiments of the invention described above include summarizing semantic associations between media content items. In this regard, the at least one memory and the computer program code may be further configured to, with the processor, cause the apparatus to receive user input via a selected visual representation that results in execution of a filtering operation in which additional media content items associated with metadata that corresponds to the selected visual representation are identified.

For example, a user may scan a picture file and may receive a visual representation corresponding to a person "Amy." The user may be able to select the visual representation as a filter and may scan more media files that show an association with Amy based on the associated metadata, such as a photograph taken by Amy, a photograph taken at Amy's house, a photograph showing Amy, a playlist of music created by Amy, a photograph Amy likes, a media content item that has been rated by Amy, and so on.

Figure 5A:
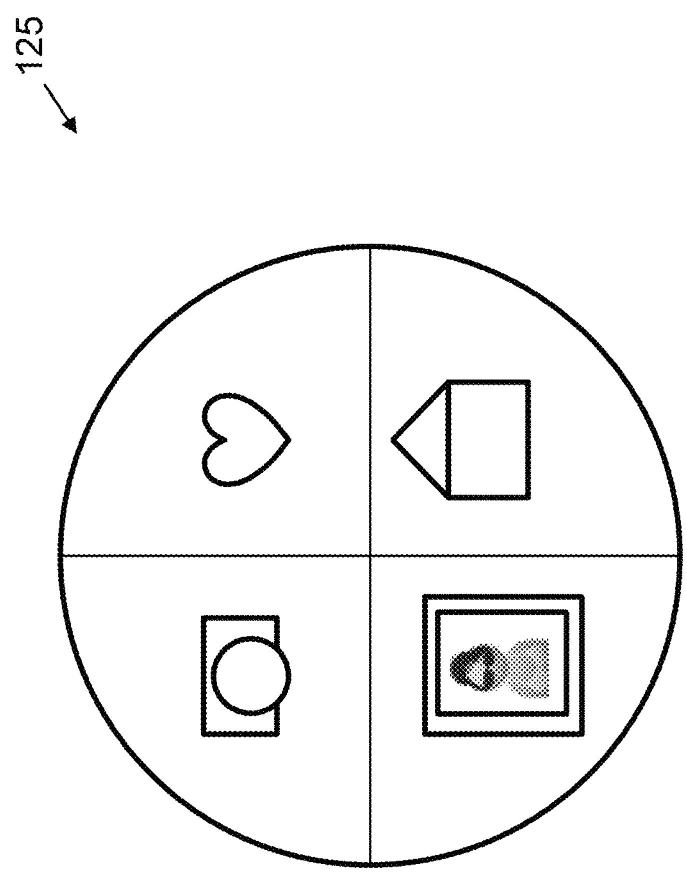
FIG. 5A illustrates a graphical presentation of a summary of a visual representation and the association of corresponding metadata with the associated media content item.

In addition, the system can show a summary of different media associations with the selected visual representation filter. The summary may include the visual representation used as the filter (in this example, a visual representation of Amy), as well as a graphical indication of the particular association between the visual representation and the media content item. For example, a picture of a camera may indicate that Amy took the photo (the media content item in this example); a picture of a house may indicate that the photo was taken at Amy's home; a picture of a user inside a picture frame may indicate that Amy appears in the photo; a picture of scissors or a paintbrush may indicate that Amy created the media content item (e.g., put together the playlist, in an example where the media content item is a playlist); a picture of a heart may indicate that Amy liked the media content item; and a picture of a scale, a thermometer, or a slider bar with a rating may indicate that Amy rated the particular content item. In some cases, as illustrated in FIG. 5A, a summary 125 of the visual representation and the association of the corresponding metadata with the associated media content item may be presented graphically, such as in a pie chart that shows the various ways the metadata (e.g., "Amy") is associated with the different selected media content items.

Furthermore, a user may create new associations between a visual representation corresponding to metadata and the associated media content item. For example, a user may scan a media content item as described above and identify a visual representation corresponding to metadata, such as "Amy" of the previous example. The association between the metadata "Amy" and the media content file may be identified by a graphical indication such as a house to denote that the media content item (in this case, a photograph) was taken at Amy's residence. In some embodiments, the user may add new associations by inserting a new graphical indication. For example, the user may apply an additional graphical indication (e.g., a camera) to the metadata "Amy" to represent that not only was the photo taken at Amy's house, but that Amy was also the person taking the picture.

In some embodiments, the apparatus may be caused, e.g., by the processor, to suggest additional visual representations corresponding to additional metadata that may be associated with a particular media content item. For example, a user may scan a media content item and identify and present a visual representation of metadata associated with the item, such as a person present in the picture. Based on the identified visual representation of metadata already associated with the media content item (e.g., the person), additional visual representations of other metadata may be suggested to the user for possible association with the item, such members of the person's family, pets, friends, etc. who the user may recognize as also being in the picture. The user may thus select some of the suggested visual representations of metadata to apply to the media content item, thereby adding metadata suggested by the apparatus to the media content item.

In some cases, the metadata associated with a particular media content item may be categorized according to levels of abstraction of the content item. For example, a personal music collection of the user (or of a music service) may include various levels of abstraction, such as (from the highest level to the lowest level) catalog, genres, artists, albums, playlists, and tracks. At the highest, or most general level of detail (e.g., catalog), only certain metadata may be appropriately associated, such as the musical genre of the catalog. When the user goes deeper into a particular genre of the music catalog and scans the artists in a particular genre, other metadata may be accessible, such as metadata associated with the artist and other stylistic attributes. Other metadata, which, while associated with the media content item in general, may not be associated with the artists level of abstraction (such as metadata associated with particular tracks of music, in this example) may not be presented or accessible to the user. Going further still, if the user scans a more detailed (lower) level of abstraction, such as the album content itself, the user may see metadata (and, thus visual representations of metadata) associated more particularly with the tracks, such as metadata regarding tempo or mode (e.g., major or minor key of music on the track).

Similarly, in some embodiments, the apparatus may be caused to automatically (e.g., without further input from the user) create visual representations that can be used when scanning the collection in higher levels of abstraction. Thus, as an example, although it may not make sense to show metadata associated with the tempi of individual tracks at the genre abstraction level, the apparatus may be caused (e.g., by the processor) to identify a few most common tempi, or the most common tempo value of the tracks belonging to that collection and creating a visual representation corresponding to the summary tempo value.

As noted above, in some cases a user may define a visual representation that corresponds to particular metadata, such as by selecting a photograph of an individual described by certain metadata (e.g., a photo of "Amy"). In some embodiments, the user may conduct a search of media content items that may not have "Amy" as metadata, but that may have an image of Amy that matches the visual representation defined by the user (e.g., the photo of Amy). For example, although a picture of Amy at a family reunion may not have Amy identified as part of its existing metadata, such a search conducted with respect to a visual representation of "Amy" may return the family reunion picture as a result because a portion of the image (e.g., the actual picture of the family at the reunion) matches the visual representation provided by the user as the search criteria. In this way, the user may be able to control the search and find more media content items that include Amy, but for some reason may never have been tagged to identify "Amy" as part of the associated metadata.

In another example, a user may use a user device as described above to scan a media content item presented on a target device and receive metadata (e.g., by reading metadata as described above) regarding an individual and the associations of this individual with the media content item. The user may edit the set of associations, for example, by removing some of the associations or adding new associations using the user device. The user may then interact with the user device to initiate a search of media content items. As a result, media content items from the target device that match the individual and the selected associations may be searched. For example, if Amy (from our previous examples) is associated with a particular media content item (e.g., a photograph) as the person who took the photo and the user adds the association "photo taken at Amy's home," then the search would return images from the target device that are both taken by Amy and are taken at Amy's home.

In still other embodiments, a group of media content items presented on the display 68 of a target device 110 (FIG. 4A) may be shown via a viewfinder 140 (FIG. 4B) of the user device 100 on the display 69 of the user device. Thus, the user may see the group of items and the visual representation of corresponding metadata on the display 69 of the user device 100. In this case, the user may select media content items in the group of items by interacting with the display 69 of the user device without having to interact with the target device 110. Moreover, there may be graphical indicators of the metadata associated with each media content item (e.g., identifiable graphical symbols such as barcodes or watermarks) that allow the user device to recognize the metadata items provided on the display 68 of the target device 110 next to the associated media content items. These graphical indicators may be recognized by the user device 100 through analysis of the viewfinder feed (e.g., via the processor of the apparatus embodied by the user device as described above). When the user of the user device 100 interacts with a position of the display 69 of the user device, the closest graphical indicator at that location may be obtained. Information relating to the particular graphical indicator may be sent to the target device 110-when the user of the user device 100 executes an operation associated with the media content item, such as to add metadata, and based on this information the target device may be able to associate the metadata to the correct media content item.

Although the examples described above and depicted in FIGS. 4A-5, for example, involve two different devices—a target device presenting the media content items and a user device reading the associated metadata, presenting the visual representations, and receiving the user input via the visual representation—in some embodiments, the reading of the metadata may be accomplished using a user interface component of the same device on which the media content items are presented (e.g., the target device itself). The user interface component may be graphically depicted as a magnifying glass or an x-ray symbol, for example. The user may drag the user interface component over the visible media item (such that the user interface component overlays the media content item), and as a result, the visual representation corresponding to the metadata may be presented on the user interface component (e.g., on the same display of the target device on which the media content item is presented). The interaction may otherwise be similar to the embodiments described above in which both a target device and a user device are involved (FIGS. 4A-5), but in this case the interactions would occur on the user interface component presented on the target device display rather than on the display of a separate user device. Moreover, although many of the examples above refer to media content items, it is understood that embodiments of the invention may be applicable to other types of content items that are associated with metadata, such as text document, websites, physical objects, etc.

Accordingly, embodiments of the invention described above provide an easier, more intuitive, and more entertaining way for a user to manage metadata by allowing a user to execute operations relating to the metadata through interactions with visual representations of that metadata. Embodiments of the invention further provide ways for a user to define visual objects and use such objects for searching media content items, such as by using a visual representation of metadata as a filter and displaying graphical depictions of associations between the visual representations of metadata and the associated media content item. Moreover, operations executed on the visual representations, such as copying, pasting, and modifying the visual representations are translated to actions on the metadata itself and can be applied across different devices, as well as different media content items and groups of media content items.

Figure 6:
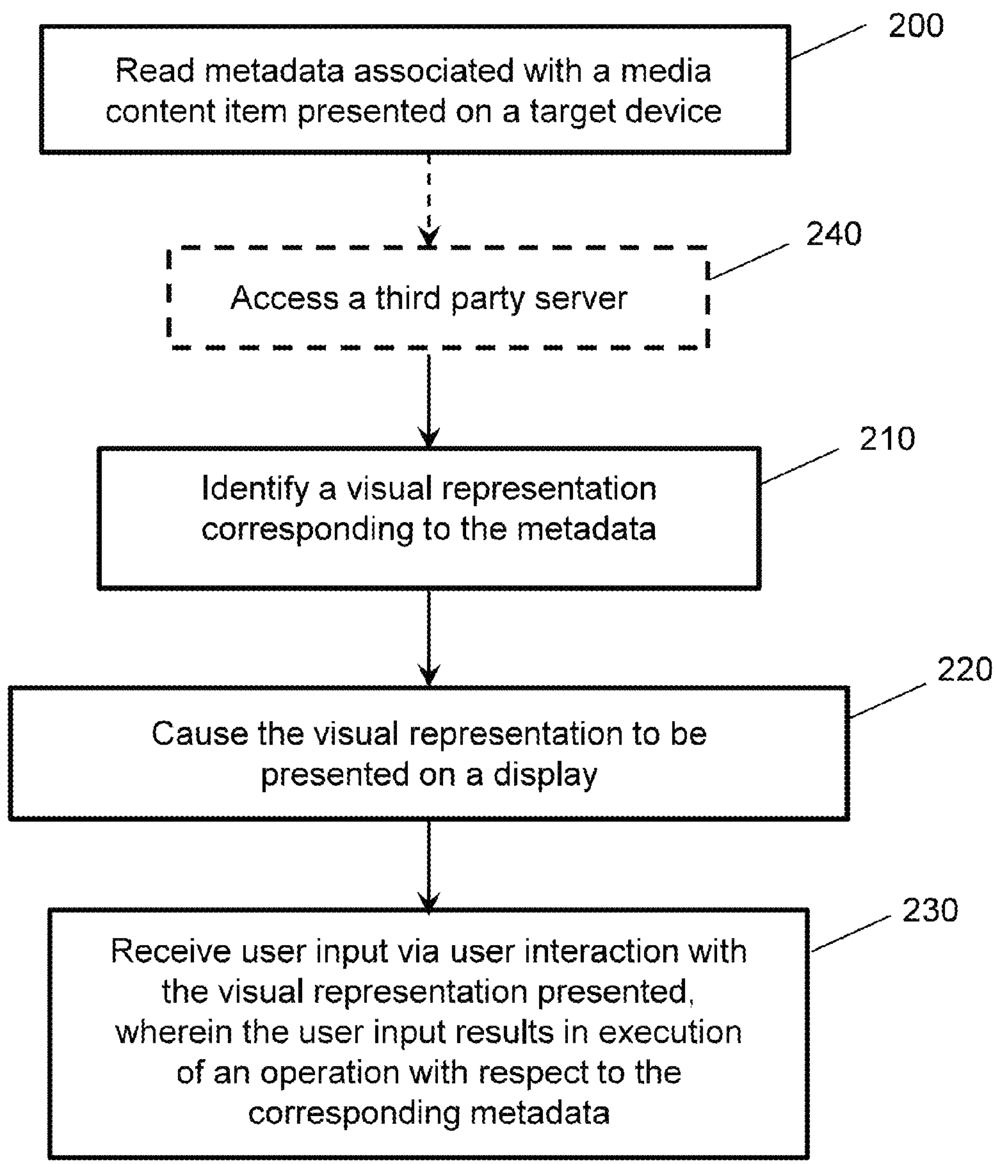
FIG. 6 illustrates a flowchart of methods of providing a visual representation of metadata according to example embodiments of the present invention.

FIG. 6 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for providing visual representations of metadata is shown in FIG. 6. FIG. 6 depicts an example embodiment of a method for providing visual representations of metadata that includes reading metadata associated with a media content item presented on a target device at block 200 and identifying a visual representation corresponding to the metadata at block 210. The visual representation may be presented on a display at block 220. User input may be received via user interaction with the visual representation presented at block 230, where the user input results in execution of an operation with respect to the corresponding metadata. The metadata may be read, in some cases, using a user device that is different from the target device, whereas in other cases the metadata may be read using the same device (e.g., the target device itself). Thus, in some cases, the display upon which the visual representation may be presented may be a display of the user device. In some embodiments, the visual representation may be identified by accessing a third party server at block 240.

The user input may, in some cases, comprise copying the visual representation and applying the copied visual representation to a different media content item, where the resulting operation that is executed associates the metadata corresponding to the copied visual representation with the different media content item. The media content item may be presented on a first target device and the different media content item may be presented on a second target device. In still other cases, user input may be received via a selected visual representation that results in execution of a filtering operation in which additional media content items associated with metadata that corresponds to the selected visual representation are identified. Moreover, in some embodiments, metadata associated with a plurality of media content items that are displayed substantially simultaneously, and visual representations of the metadata associated with the plurality of media content items displayed may be identified. The visual representations may be presented on the display, and user input may be received via interaction with at least one of the visual representations.

In some embodiments, certain ones of the operations above may be modified or further amplified as described below. Furthermore, in some embodiments, additional optional operations may be included, some examples of which are shown in dashed lines in FIG. 6. Modifications, additions, or amplifications to the operations above may be performed in any order and in any combination.

In an example embodiment, an apparatus for performing the method of FIG. 6 above may comprise a processor (e.g., the processor 70 of FIG. 2) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operation 200 may comprise, for example, the processor 70 and/or a device or circuit for executing instructions or executing an algorithm for processing information as described above. Examples of means for performing operation 210 may comprise, for example, the processor 70, the memory device 76, and/or a device or circuit for executing instructions or executing an algorithm for processing information as described above. Examples of means for performing operations 220 and 230 may comprise, for example, the processor 70, the user interface transceiver 72, and/or a device or circuit for executing instructions or executing an algorithm for processing information as described above. Examples of means for performing operation 240 may comprise, for example, the communication interface 74, the processor 70, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:

read, via a user device, metadata associated with a media content item presented on a target device, wherein the user device is disposed proximate the target device such that the media content item is read through a viewfinder of the user device;

identify a graphical representation corresponding to the metadata that is read;

cause the graphical representation to be presented on a display of the user device; and receive user input at the user device via user interaction with the graphical representation presented, wherein the user input results in execution of an operation with respect to the corresponding metadata, wherein the media content item is presented on the display of the user device, and wherein the at least one memory and the computer program code are configured to, with the processor, cause the apparatus to cause the graphical representation to be presented on the display of the user device with the media content item.

2. The apparatus of claim 1, wherein the at least one memory and the computer program code are configured to, with the processor, cause the apparatus to identify the graphical representation by accessing a third party server.

3. The apparatus of claim 1, wherein the user input comprises copying the graphical representation and applying the copied graphical representation to a different media content item, and wherein the resulting operation that is executed associates the metadata corresponding to the copied graphical representation with the different media content item.

4. The apparatus of claim 3, wherein the media content item is presented on a first target device and the different media content item is presented on a second target device.

5. The apparatus of claim 1, wherein the at least one memory and the computer program code are further configured to, with the processor, cause the apparatus to receive user input via a selected graphical representation that results in execution of a filtering operation in which additional media content items associated with metadata that corresponds to the selected graphical representation are identified.

6. The apparatus of claim 1, wherein the at least one memory and the computer program code are further configured to, with the processor, cause the apparatus to read, via the user device, metadata associated with a plurality of media content items that are displayed substantially simultaneously; to identify graphical representations of the metadata associated with the plurality of media content items displayed; to cause the graphical representations to be presented on the display; and to receive user input via interaction with at least one of the graphical representations.

7. A method comprising:

reading, via a user device, metadata associated with a media content item presented on a target device, wherein the user device is disposed proximate the target device such that the media content item is read through a viewfinder of the user device;

identifying, via a processor, a graphical representation corresponding to the metadata that is read;

causing the graphical representation to be presented on a display of the user device; and receiving user input at the user device via user interaction with the graphical representation presented, wherein the user input results in execution of an operation with respect to the corresponding metadata, wherein the media content item is presented on the display of the user device, and wherein the at least one memory and the computer program code are configured to, with the processor, cause the apparatus to cause the graphical representation to be presented on the display of the user device with the media content item.

8. The method of claim 7, wherein identifying the graphical representation comprises accessing a third party server.

9. The method of claim 7, wherein the user input comprises copying the graphical representation and applying the copied graphical representation to a different media content item, and wherein the resulting operation that is executed associates the metadata corresponding to the copied graphical representation with the different media content item.

10. The method of claim 9, wherein the media content item is presented on a first target device and the different media content item is presented on a second target device.

11. The method of claim 7, wherein receiving user input comprises receiving user input via a selected graphical representation that results in execution of a filtering operation in which additional media content items associated with metadata that corresponds to the selected graphical representation are identified.

12. The method of claim 7 further comprising reading, via the user device, metadata associated with a plurality of media content items that are displayed substantially simultaneously; identifying graphical representations of the metadata associated with the plurality of media content items displayed; causing the graphical representations to be presented on the display; and receiving user input via interaction with at least one of the graphical representations.

13. A computer program product comprising at least one non-transitory computer-readable storage medium having computer-executable program code portions stored therein, the computer-executable program code portions comprising program code instructions for:

reading, via a user device, metadata associated with a media content item presented on a target device, wherein the user device is disposed proximate the target device such that the media content item is read through a viewfinder of the user device;

identifying a graphical representation corresponding to the metadata that is read;

causing the graphical representation to be presented on a display of the user device; and receiving user input at the user device via user interaction with the graphical representation presented, wherein the user input results in execution of an operation with respect to the corresponding metadata, wherein the media content item is presented on the display of the user device, and wherein the at least one memory and the computer program code are configured to, with the processor, cause the apparatus to cause the graphical representation to be presented on the display of the user device with the media content item.

14. The computer program product of claim 13, wherein computer program portions for identifying the graphical representation are further configured for accessing a third party server.

15. The computer program product of claim 13, wherein the user input comprises copying the graphical representation and applying the copied graphical representation to a different media content item, and wherein the resulting operation that is executed associates the metadata corresponding to the copied graphical representation with the different media content item.

16. The computer program product of claim 13, wherein receiving user input comprises receiving user input via a selected graphical representation that results in execution of a filtering operation in which additional media content items associated with metadata that corresponds to the selected graphical representation are identified.

* * * * *